(12) United States Patent
Lukas

(10) Patent No.: US 6,887,181 B2
(45) Date of Patent: May 3, 2005

(54) LOAD REDUCING METHOD FOR AUTOMATIC TRANSMISSIONS DURING LIMP HOME SHIFTING OPERATIONS

(75) Inventor: Hagen Lukas, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 14 days.

(21) Appl. No.: 10/163,329

(22) Filed: Jun. 5, 2002

(65) Prior Publication Data

US 2003/0004034 A1 Jan. 2, 2003

(30) Foreign Application Priority Data

Jun. 19, 2001 (DE) .......................................... 101 29 548

(51) Int. Cl.$^7$ .............................................. B60K 41/04
(52) U.S. Cl. ...................... 477/107; 477/109; 477/906
(58) Field of Search ................................. 477/107, 109, 477/906

(56) References Cited

U.S. PATENT DOCUMENTS

| | | | | |
|---|---|---|---|---|
| 4,667,541 A | * | 5/1987 | Shimaoka et al. ............ | 477/61 |
| 4,838,125 A | * | 6/1989 | Hamano et al. ............. | 477/129 |
| 5,088,353 A | * | 2/1992 | Yoshida ........................ | 477/92 |
| 5,216,938 A | * | 6/1993 | Yamaguchi .................. | 477/107 |
| 5,928,110 A | * | 7/1999 | Vornehm et al. ............. | 477/166 |
| 5,964,680 A | * | 10/1999 | Salecker et al. .............. | 477/74 |
| 6,432,024 B2 | * | 8/2002 | Hattori et al. ................ | 477/44 |
| 6,443,871 B2 | * | 9/2002 | Taniguchi et al. ............ | 477/44 |
| 6,456,917 B1 | | 9/2002 | Gierling et al. ............... | 701/51 |
| 6,554,738 B1 | | 4/2003 | Bek ............................. | 477/107 |

FOREIGN PATENT DOCUMENTS

| | | | | |
|---|---|---|---|---|
| DE | 198 44 623 A1 | 3/2000 | .......... | B60K/41/00 |
| DE | 199 09 496 A1 | 9/2000 | .......... | B60K/41/08 |
| JP | 03099947 A | * 4/1991 | .......... | B60K/41/22 |

* cited by examiner

*Primary Examiner*—Sherry Estremsky
*Assistant Examiner*—David D. Le
(74) *Attorney, Agent, or Firm*—Davis & Bujold, P.L.L.C.

(57) ABSTRACT

Within the scope of a load reduction method of automatic transmissions or clutches of a motor vehicle during emergency program shifting operations, an engine torque reduction is carried out during the emergency program shifting operation from a normal shifting program to an emergency program (NP).

11 Claims, 3 Drawing Sheets

LOAD REDUCING METHOD FOR AUTOMATIC TRANSMISSIONS DURING LIMP HOME SHIFTING OPERATIONS

FIELD OF THE INVENTION

This invention relates to a load reducing method for automatic transmissions during emergency program shifting operations.

BACKGROUND OF THE INVENTION

In the case of an operating error or failure of the transmission, emergency program shifting operations are carried out in order to change over the transmission to fail-safe state in which further travel with emergency running properties is possible.

Vehicles with high powered motorization and particularly shifting elements thereof become considerably loaded during an emergency shifting operation. The clutches concerned thus reach their load limits already after a few emergency program shifting operations under full load at high rotational speed of the engine, and this negatively affects the service life and accordingly the durability.

Constructional measures, such as enlargement of the clutch or increase of the number of discs for reducing the thermal load of the clutch that generates, are not adequate due to the installation space required.

An optimization of the lubrication or cooling or an increase in the amount of lubricant would not completely solve the problem. Besides, such a procedure would negatively affect the lubrication conditions in the rear-mounted unit of the transmission. In addition an extensive permanent testing would be needed on the test bench, which is associated with considerable expense and is time consuming.

For the above reasons, the use of thermally stabler clutch linings also is not the optimum solution.

The problem on which this invention is based is to indicate a method for load reduction of transmissions or clutches during emergency program shifting operations, which method can be economically and reliably applied without further mechanical constructional measures.

SUMMARY OF THE INVENTION

It is proposed to obtain a direct reduction of the clutch load during emergency shifting operations by reducing the engine torque.

The engine torque can be implemented both in an electrical and in a mechanical emergency running during emergency program shifting operations provided by the inventive method.

In an electrical emergency running which, according to the prior art, is triggered by diagnostic functions, there have hitherto been disconnected only the outputs of the electronic transmission control (EGS) which concern the hydraulic actuators such as magnetic valves and pressure regulators, the electronic transmission control being further activated. The emergency program shifting operation then takes place strictly hydraulically.

According to the invention, it is, on the contrary, provided to implement an engine torque reduction by a corresponding requirement of the electronic transmission control or a standard about the controller area network bus (CAN-BUS) on the engine control. The engine engagement or the engine torque reduction is carried out via functions already existing in the engine control, such as firing angle adjustment within the scope of an engine engagement and/or injection scattering in the engine control during the time of the emergency program shifting operation.

Within the scope of a variant of the invention, it is proposed to carry out the engine torque reduction according to functionality requirements and comfort considerations depending on the operating conditions at the moment of the emergency program shifting operation. Such operating conditions can be, for example, the gear introduced, load and rotational speed of the engine.

In the case of a mechanical transmission emergency running (EGS-not operative) and/or a CAN bus interruption, the reduction of the engine torque is carried out during the emergency program shifting operation via an additional functionality in the engine control.

The torque load of the transmission, during emergency program shifting operations, can be immediately and significantly reduced by the above described method. The clutches can thus be protected and a longer duration is ensured.

The method further proves to be economical and simple inasmuch as very expensive and lengthy mechanical optimizations are not needed.

BRIEF DESCRIPTION OF THE DRAWINGS

The invention will now be described, by way of example, with reference to the accompanying drawings in which.

DETAILED DESCRIPTION OF THE INVENTION

Figure 1:
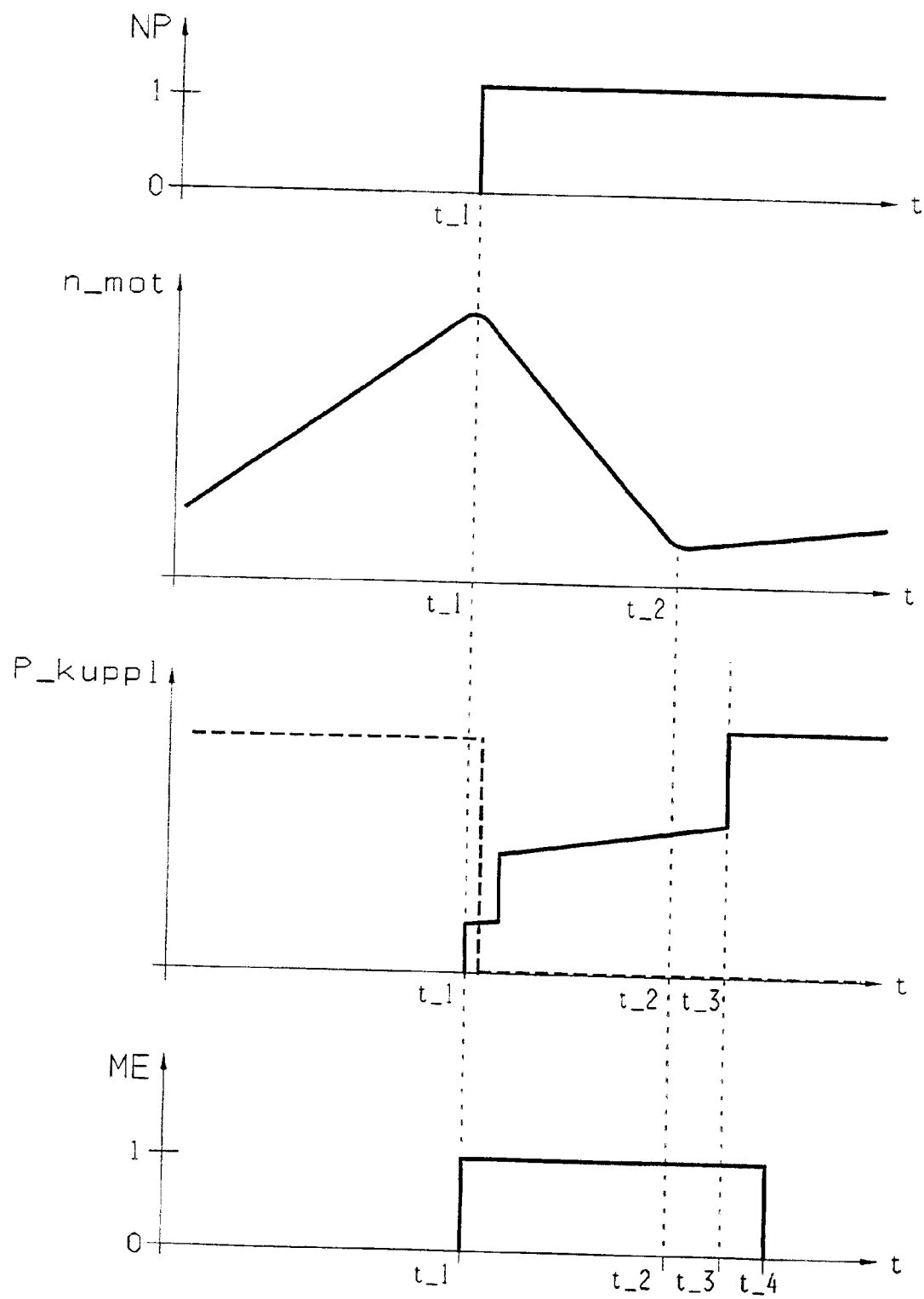
FIG. 1 is the function sequence according to the invention with reference to the following time diagrams:
a) a state time diagram of the emergency program shifting operation,
b) a rotational speed time diagram,
c) a clutch pressure time diagram and
d) a state time diagram of the engine engagement.

For the case of an electrical emergency running the inventive method functions as follows:

The occurrence of an error is diagnosed and detected at the moment $t\_1$ by the electronic transmission control and then the emergency program NP is activated, as can be seen from the above diagram in FIG. 1, which shows a state time diagram of the emergency program shifting operation. According to the invention, at the moment $t\_1$ an engine engagement ME is also introduced in order to reduce the engine torque $T\_mot$. This is illustrated in the rotational speed time diagram in FIG. 1 (second diagram from top): the engine rotational speed $n\_mot$ is reduced beginning at $t\_1$ in direction to the synchronization point of the emergency program speed.

According to the clutch pressure time diagram from FIG. 1, the shifting clutches concerned are, at the same time, hydraulically activated (disconnecting clutch shown in dotted line, engaging clutch in solid line). The bottom diagram in FIG. 1 is a state time diagram for the engine engagement ME; the state 1 corresponds to an activation of the engine engagement ME and is effected at a moment $t\_1$.

The intensity of the engine engagement ME is here function of the operating conditions at the moment $t\_1$ of the emergency program shifting operation, preferably of the engine rotational speed n_mot and/or of the shifting interval and/or of the engine torque T_mot.

The electronic transmission control delivers the nominal value standard for the engine torque T_mot and a time duration t_ME for the engine engagement ME which is triggered during the emergency program shifting operation.

The synchronization point of the emergency program sequence is reached at the moment t_2, the engine rotational speed n_mot (rotational speed time diagram) reaching here a minimum value in order subsequently to rise again.

At the moment t_3, the main pressure on the emergency gear clutch is reached (see the clutch pressure time diagram); the engine engagement ME is then terminated at the moment t_4 ("ME=0").

Figure 2:
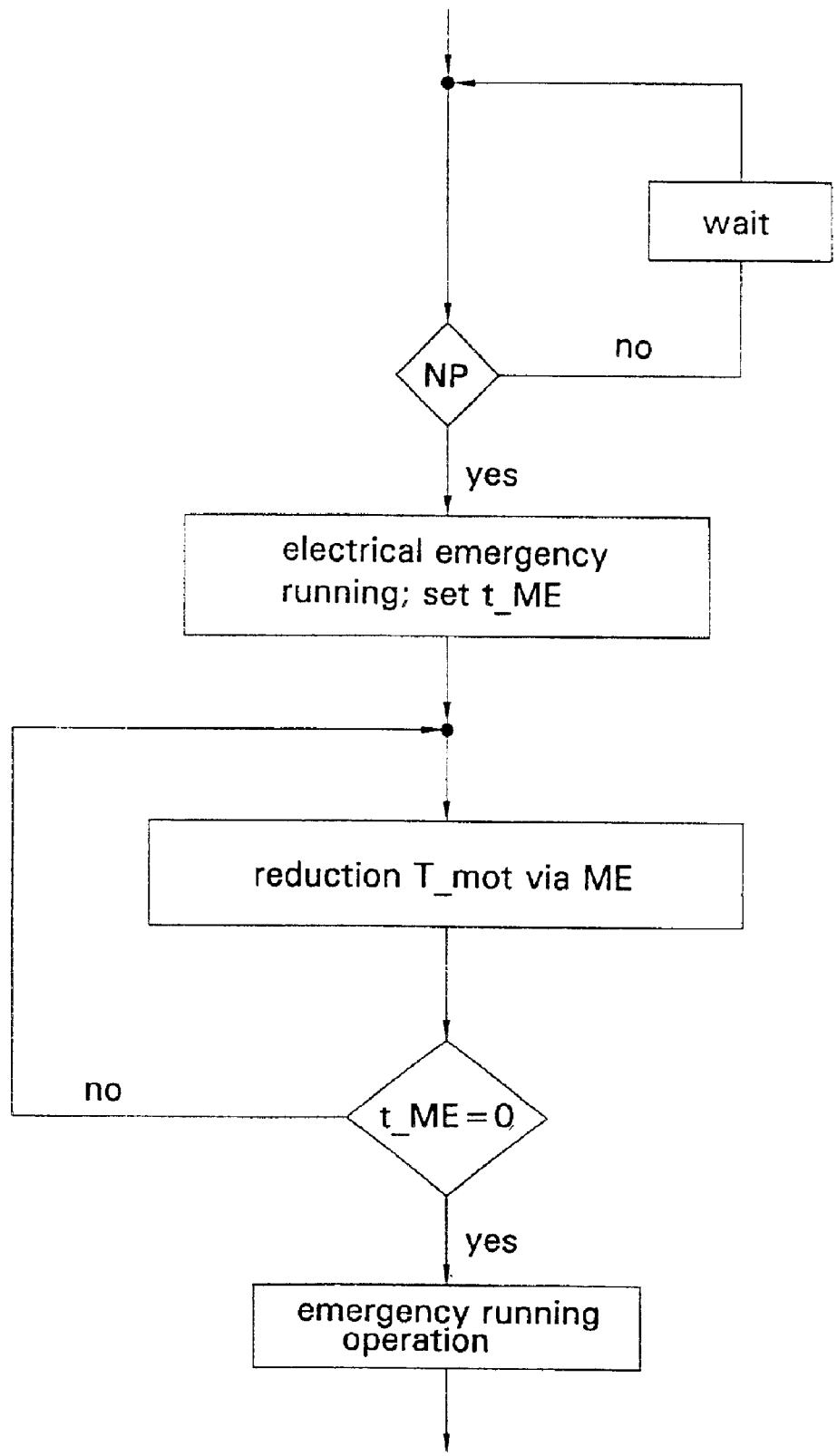
FIG. 2 is a block shift pattern for an electrical emergency running according to the invention.

FIG. 2 is shown a block gear shift-diagram of the inventive method for the case of an emergency running during which the electronic or electrohydraulic control of the transmission still is operative and likewise the communication of the electronic transmission control unit to the electronic engine control unit is in variably intact. After activation of the emergency program NP by the electronic transmission control, the electrical emergency running is stated and the time period t_ME is established the same as the intensity of the engine engagement ME. In the next step, the engine torque T_mot is reduced, via the engine engagement ME, for the time period t_ME in order then to change over to the emergency running operation.

Figure 3:
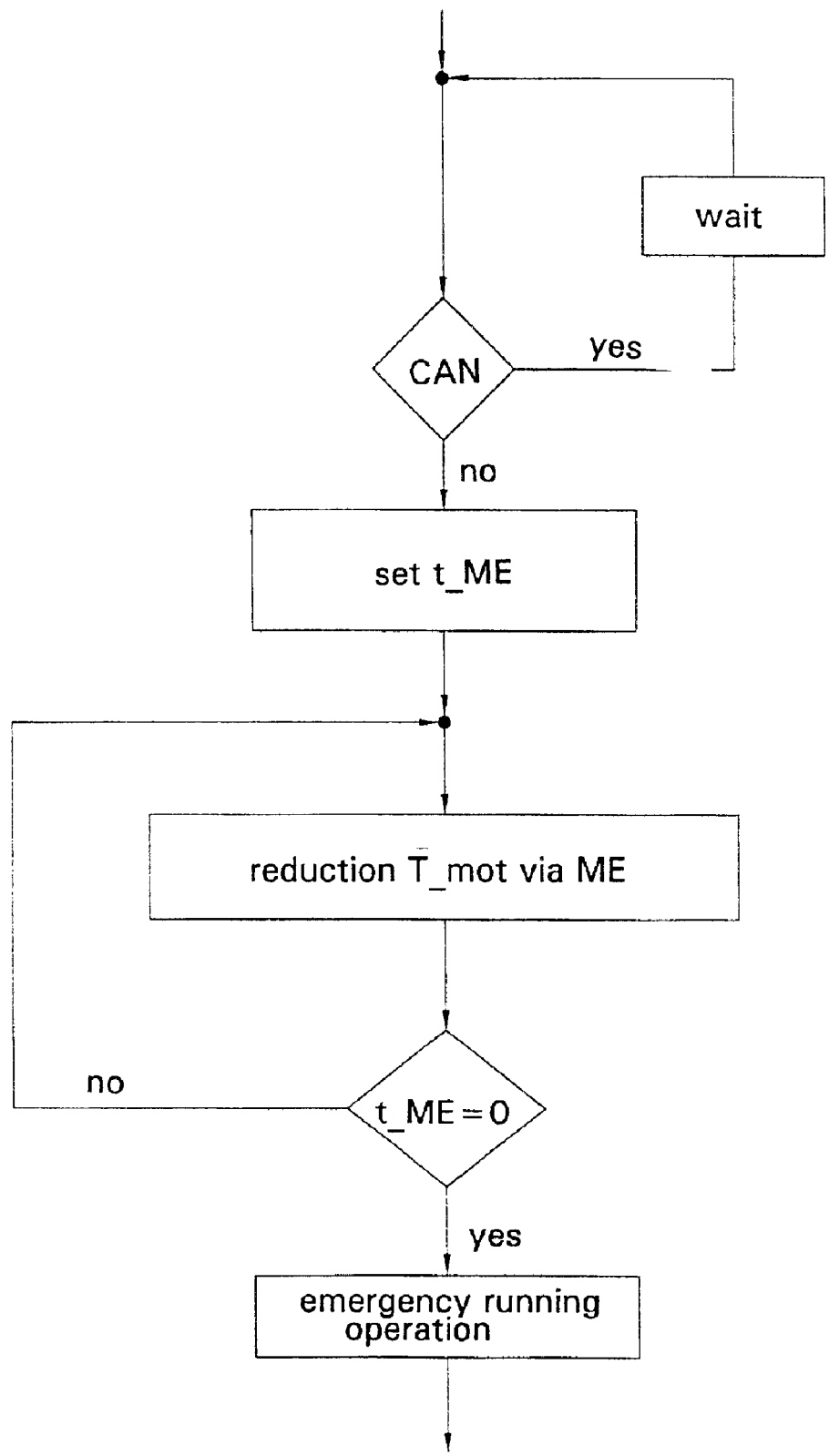
FIG. 3 is a block shift pattern for a mechanical emergency running according to the invention.

The sequence of the method for the case of a mechanical emergency running or of a failure of the CAN bus is made clear in FIG. 3. Contrary to the above described electrical emergency running, the functions are assumed by the electronic,engine control, since the electronic transmission control can no longer perform any functions: when the electronic transmission control (EGS) or the CAN bus are inoperative, that is, when the engine control receives no signals from the EGS, the emergency program NP is activated and the time period t_ME and intensity of the engine engagement ME as function of the operating parameters are determined by the electronic engine control. The engine torque T_mot is then reduced, via the engine engagement ME, for the time period t_ME and changed over to the emergency running operation.

The inventive method offers an active clutch protection combined with an increased shifting comfort and ensures a mechanical protection of the transmission during every shifting transition from normal operation with a normal shifting program to an emergency running program.

Furthermore, the method is simple and can be implemented without added input variables or operands, it being possible to divide the implementation of the operation between the transmission control and the engine control.

| References | |
|---|---|
| NP | emergency program |
| n_mot | engine rotational speed |
| ME | engine engagement |
| T_mot | engine torque |
| P_kuppl | clutch pressure |
| t_1 | moment of activation of the emergency program |
| t_2 | moment of reaching the synchronization point of the emergency shifting operation |
| t_3 | moment of reaching the main pressure on the emergency gear clutch |
| t_4 | moment of termination of the engine engagement |
| t_ME | duration in time of the engine engagement |

I claim:

1. A method for reducing a clutch load in an automatic transmission of a motor vehicle during an emergency program shifting operation when an electronic transmission control of the automatic transmission is not operative, the method comprising the steps of:
    detecting the inoperative electronic transmission control as an erroneous operating condition in the automatic transmission;
    reducing an engine torque by operation of an engine control unit (ECU) during the emergency program shifting operation; and
    shifting the automatic transmission from a normal shifting program to an emergency program (NP) and continuing to operate the motor vehicle in the emergency program (NP) without the electronic transmission control.

2. The method according to claim 1, wherein:
    the engine torque reduction is carried out according to functionality requirements of the automatic transmission and comfort considerations.

3. The method according to claim 1, wherein
    the engine torque reduction takes place via an engine engagement (ME) with a nominal value specified for an engine torque (T_mot) for a predetermined period of time (t_ME).

4. The method according to claim 1, wherein the automatic transmission is operating in an emergency mode and the electronic control of the automatic transmission is not operative, the method further comprising the steps of:
    after detecting the erroneous operating condition in the automatic transmission and activating the emergency program and before shifting the automatic transmission from the normal shifting program to the emergency program (NP);
    reducing the engine torque by operation of the engine control unit (ECU) by
        determining a nominal value for the engine torque (T_mot) with reference to operating parameters for a predetermined time (t_ME) and relaying the nominal value for the engine torque to the engine control unit (ECU);
        triggering an engine engagement (ME) so as to reduce the engine torque (T_mot) where the intensity of the engine engagement (ME) is a function of relevant operating conditions;
        simultaneously activating at least one hydraulic gear clutch for the shifting to the emergency program (NP); and
        terminating the engine engagement (ME) according to the predetermined time (t_ME); and
    shifting the automatic transmission from the normal shifting program to the emergency program (NP).

5. The method according to claim 1, wherein:
    the engine torque reduction is carried out according to operating conditions at the moment of the automatic transmission is shifted to the emergency program NP).

6. The method according to claim 5, wherein:
    the engine torque reduction is carried out according to at least one of a gear introduced, a transmission load, and a engine rotational speed (n_mot).

7. A method for reducing a clutch load in an automatic transmission of a motor vehicle for continued operation of the motor vehicle in an emergency running program (NP), the method comprising the steps of:

detecting a failure of an electronic transmission control and activating an emergency shifting program;

determining a time period and intensity of an engine engagement as a function of current engine and transmission operating parameters;

reducing an engine torque according to the time period and intensity of the engine engagement solely via operation of the engine control unit (ECU) to significantly reduce the clutch load in the automatic transmission; and continuing operation of the motor vehicle by shifting from a normal vehicle running program to an emergency vehicle running program (NP).

8. The method according to claim 7 further comprising the step of reducing the engine torque via the engine engagement (ME) based on a specified nominal value for the engine torque (T_mot) for a predetermined period of time (t_ME).

9. The method according to claim 7 further comprising the step of reducing the engine torque according to functionality requirements for driver comfort considerations.

10. The method according to claim 9 further comprising the step of reducing the engine torque according to the current engine and transmission operating parameters established at the moment of activation of the emergency shifting operation.

11. The method according to claim 10 further comprising the step of determining the current engine and transmission operating parameters as at least one of an introduced gear, a transmission load, and a engine rotational speed (n_mot).

* * * * *